United States Patent [19]
Dent

[11] Patent Number: 5,475,705
[45] Date of Patent: Dec. 12, 1995

[54] DEMODULATOR FOR MANCHESTER-CODED FM SIGNALS

[75] Inventor: Paul W. Dent, Stehag, Sweden

[73] Assignee: Ericsson GE Mobile Communications Inc., Research Triangle Park, N.C.

[21] Appl. No.: 53,860

[22] Filed: Apr. 29, 1993

[51] Int. Cl.⁶ .............................. H03D 3/22; H04L 27/10; H03M 7/12
[52] U.S. Cl. .......................... 375/333; 375/279; 375/340; 341/70; 329/304
[58] Field of Search ................................. 375/87, 11, 14, 375/52, 55, 94; 341/70; 360/44; 329/304

[56] References Cited

U.S. PATENT DOCUMENTS

| | | | |
|---|---|---|---|
| 4,189,622 | 2/1980 | Foshee | 375/52 |
| 4,302,845 | 11/1981 | McClaughry et al. | 375/87 |
| 4,672,365 | 6/1987 | Gehman et al. | 340/531 |
| 5,048,059 | 9/1991 | Dent | 375/94 |
| 5,056,114 | 10/1991 | Wight | 375/87 |
| 5,079,512 | 1/1992 | Muto | 329/304 |
| 5,084,669 | 1/1992 | Dent | 328/134 |
| 5,166,952 | 11/1992 | Omurg et al. | 375/1 |
| 5,179,578 | 1/1993 | Ishizu | 329/304 |
| 5,220,275 | 1/1993 | Holmqvist | 328/134 |
| 5,283,815 | 2/1994 | Chennakeshu et al. | 329/304 |
| 5,305,349 | 4/1994 | Dent | 375/1 |
| 5,311,545 | 5/1994 | Critchlow | 329/304 |

OTHER PUBLICATIONS

F. Gardner, *Phaselock Techniques*, 2d. ed., John Wiley & Sons, New York (1979).
J. Hein et al., "z–Domain Model for Discrete–Time PLL's" *IEEE Trans. Circuits & Sys.*, vol. 35, pp. 1393–1400 (Nov. 1988).

*Primary Examiner*—Edward L. Coles, Sr.
*Assistant Examiner*—Kimberly A. Williams
*Attorney, Agent, or Firm*—Burns, Doane, Swecker & Mathis

[57] ABSTRACT

Binary signals that are transmitted by Manchester coding and frequency modulation are demodulated based on the behavior of the phase or complex vector value of the received signal. The polarities of the information bits may be determined by measuring the phase excursions in the middles of the Manchester symbols. A phase reference is established from a plurality of candidate phase references as a basis for comparison of the mid-symbol phase. The phase can be measured at the start-points and end-points of the symbols and averaged, or measured a plurality of times during each symbol period to generate a reference phase.

45 Claims, 7 Drawing Sheets

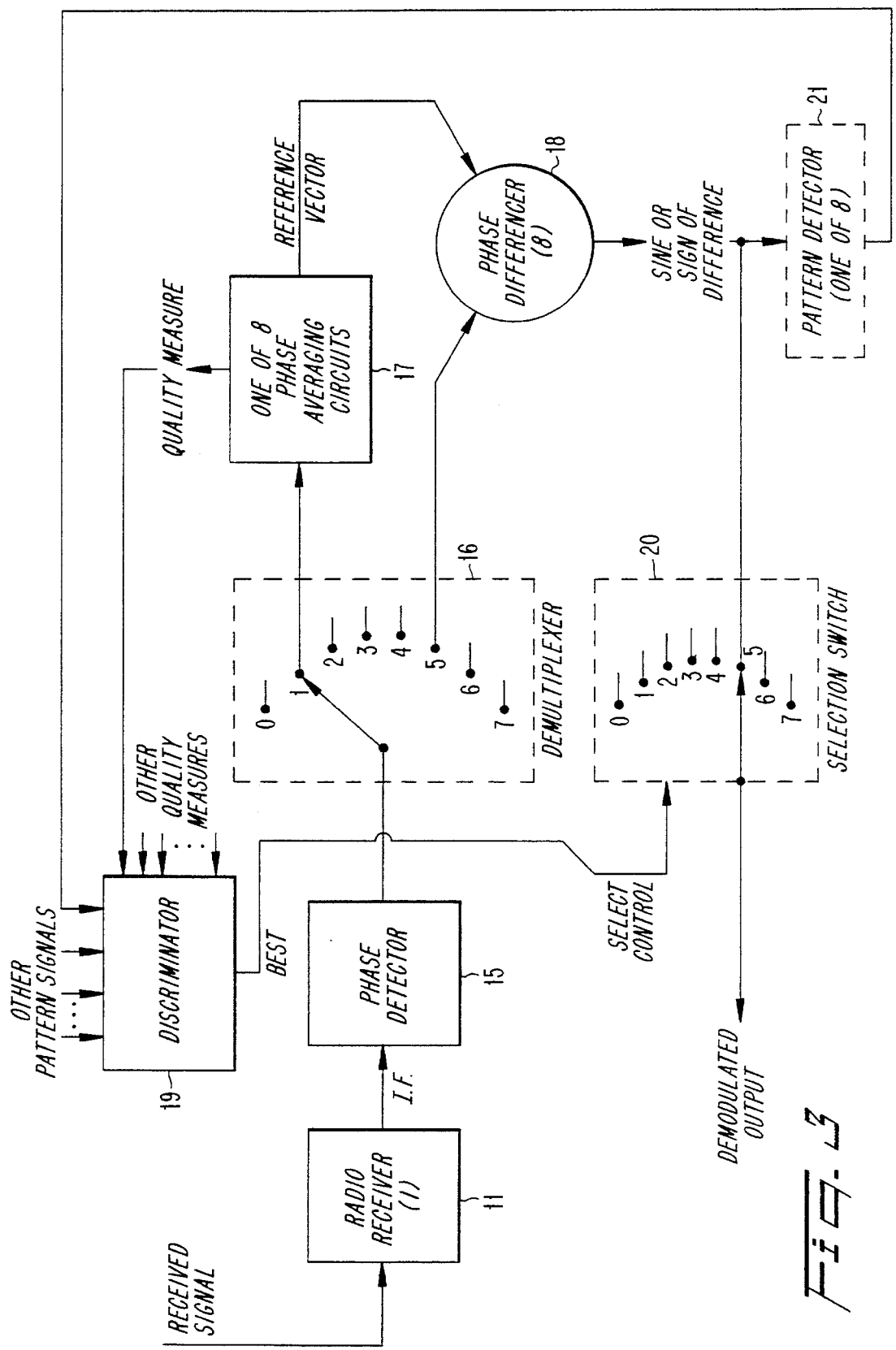

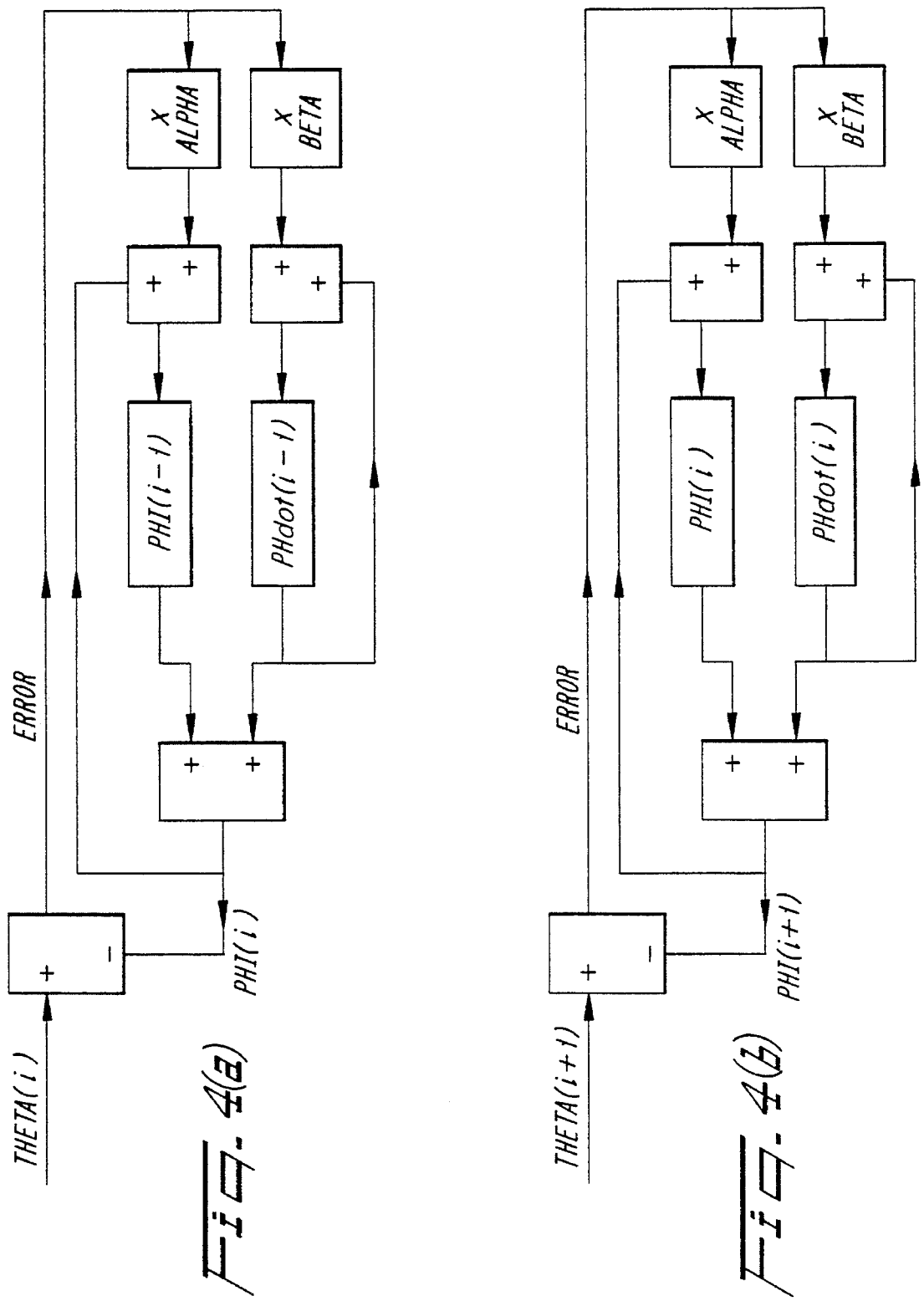

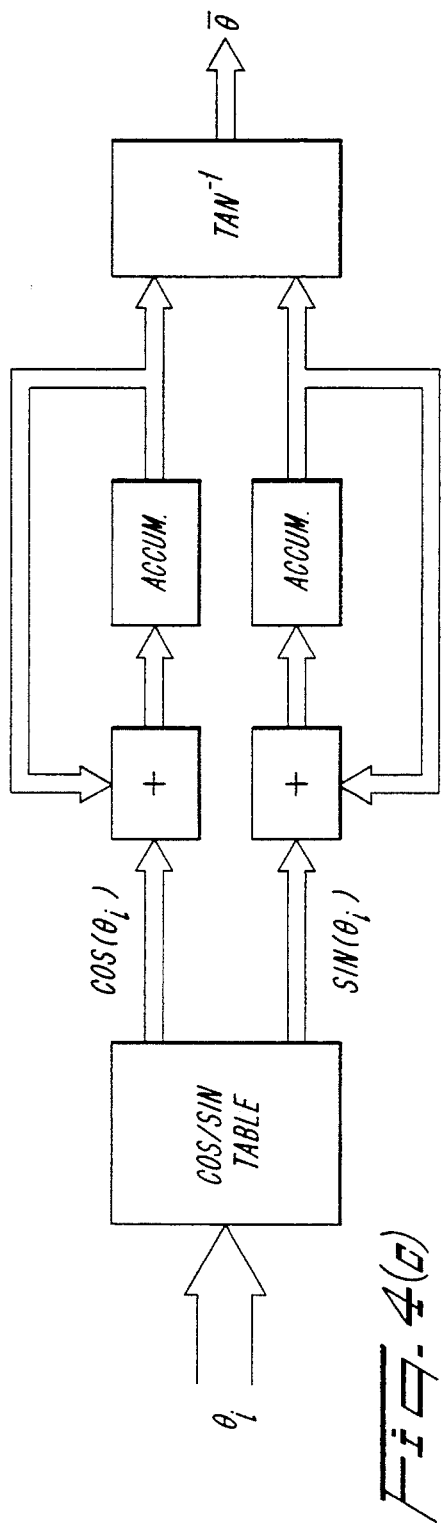
_Fig. 4(c)_
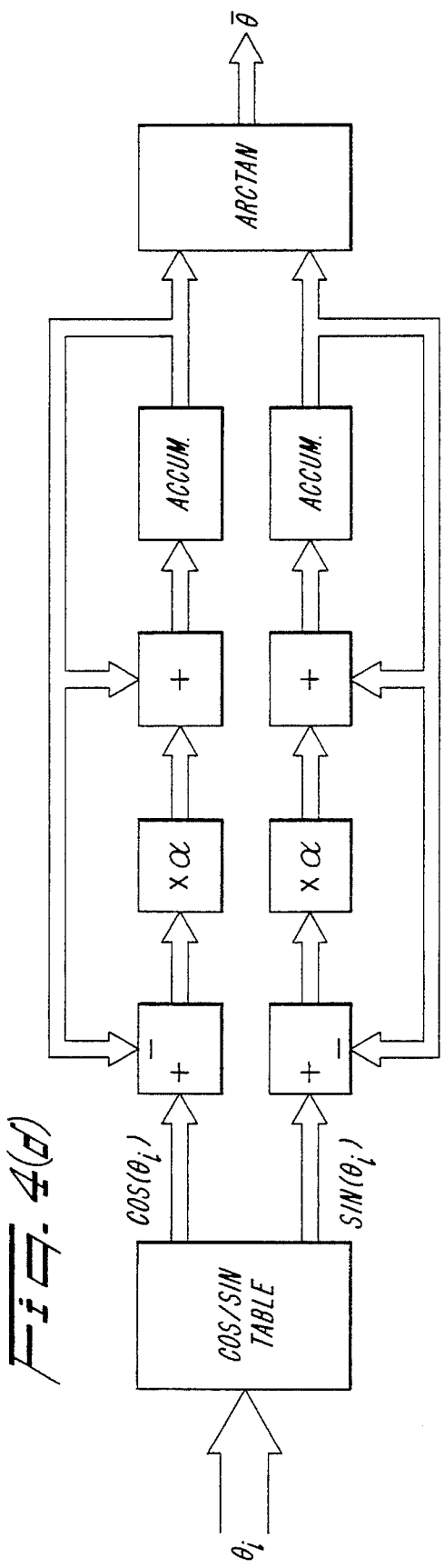
_Fig. 4(d)_

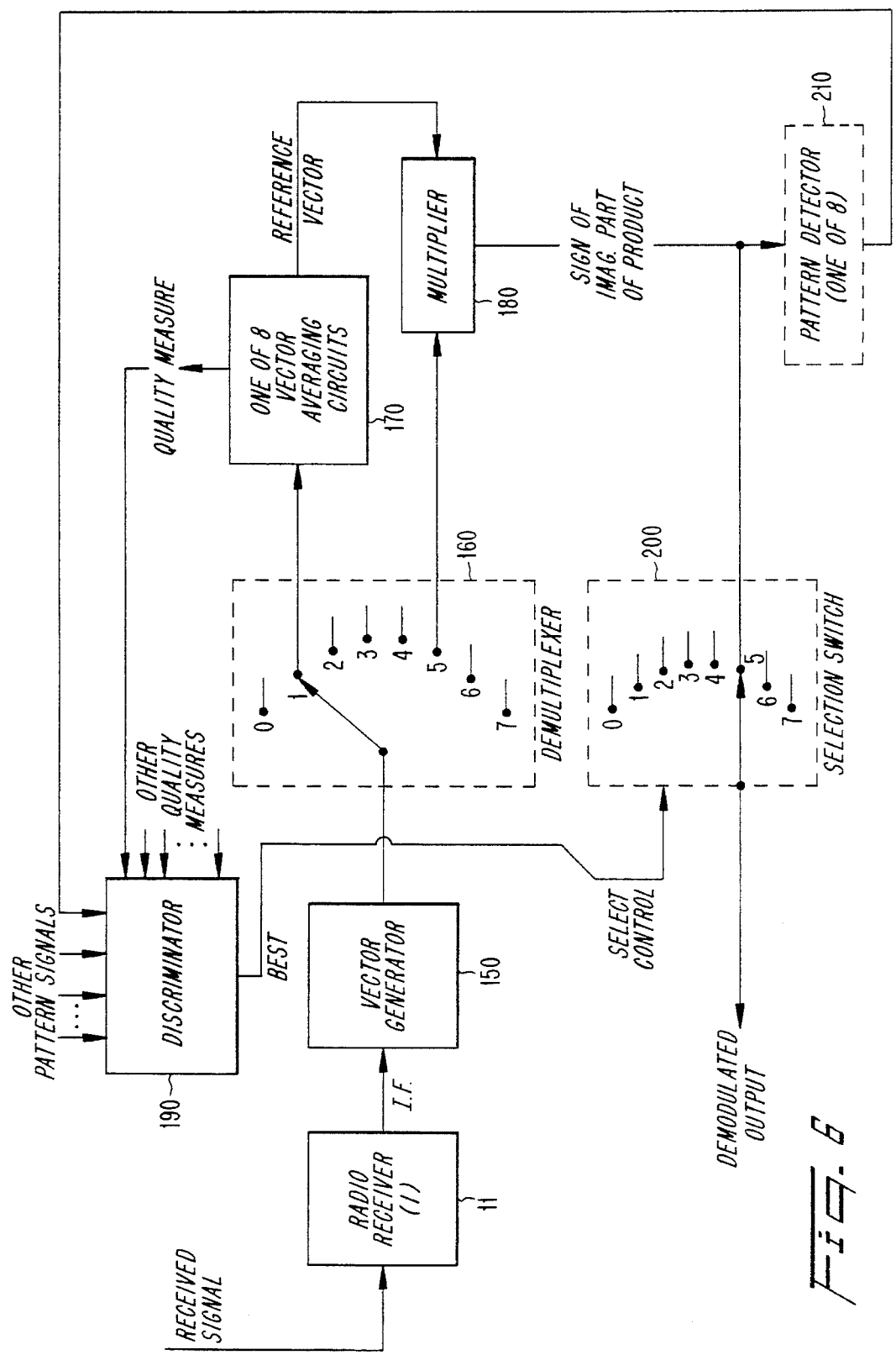

DEMODULATOR FOR MANCHESTER-CODED FM SIGNALS

BACKGROUND

The invention relates to the demodulation of digital signalling messages that are transmitted in cellular radio telephone systems and, in particular, to systems that use Manchester-coded digital frequency modulation (FM) for the transmission of such messages.

It is known to use Manchester coding of binary data in the transmission of data, e.g., the AMPS (Advanced Mobile Phone Service System) system in North America. Digital data is impressed upon the radio carrier frequency by means of FM and encoded before FM using Manchester (also known as split-phase) coding, in which an information bit "1" is represented by a two-bit codeword, or symbol, 10, and an information bit "0" is represented by a two-bit codeword, or symbol, 01. The transmitted codeword bit rate is twice the information bit rate.

Manchester coding offers many advantages. For example, the mean of the signal transmitted over the channel can be zero for information bits of either polarity, so that the channel does not require a true d.c. response. In a frequency modulated radio system, frequency errors between the transmitter and receiver cause an offset in the mean frequency of the received signal so that the mean level of a frequency modulating signal is not faithfully reproduced. Manchester coding minimizes such frequency errors.

In non-Manchester coding systems, a "1" and a "0" are distinguished by using a static signal level. Errors in the signal level arising in transmission can cause bit errors. In systems employing Manchester coding, the static level, or mean level, of the signal is not important to distinguish between a "1" and a "0". Further advantages of Manchester coding include a high signal transition density (frequent changes between "0" and "1" bits) and the ability to detect data errors and sequence violations since the two-bit words 00 and 11 represent errors rather than data.

One reason for systems to employ Manchester coding is to eliminate sensitivity to frequency errors, which cause the phases at the symbol end-points to systematically drift higher or lower and often not to return to the same value. Conventional FM systems employ a frequency discriminator to demodulate the Manchester-coded FM signal, an integrate-and-dump circuit, and means for inverting the second half of the symbol for combination with the first half of the symbol. Such systems are subject to frequency errors. Accordingly, it is desirable to equip a system with a means for improving tolerance to frequency errors, overcoming many of the disadvantages associated with conventional systems.

SUMMARY

In accordance with the invention, a demodulation system is based on the behavior of the phase or complex vector value of a signal that is frequency-modulated with Manchester-coded data signals.

In one aspect of the invention, a method for demodulating information data bits, which have been converted to Manchester-coded symbols and modulate a signal's frequency to form a stream of coded symbols, includes the step of receiving a signal including a stream of Manchester-coded symbols. The phase of the received signal is sampled a plurality of times during each symbol, and the information bit polarities represented by the coded symbols are determined from the phase samples obtained near the centers of the coded symbols relative to a plurality of phase references, each phase reference corresponding to one of the phase samples. In another aspect of the invention, the step of determining bit polarity can include selecting a phase sample nearest the center of each symbol.

The method may further include the step of deriving the phase reference values based on phase samples obtained near boundaries between the symbols, for example by averaging. The averaging may be carried out by separately averaging the cosines and sines of the phase samples. Derivation of the phase reference values is based on a moving average of phase samples obtained near the boundaries between symbols. In another aspect, the step of deriving includes applying phase samples to a phase tracking loop to determine the phase reference values.

In yet another aspect, the step of determining bit polarity includes determining the sign of the difference between each phase sample and its corresponding phase reference value, computed modulo $2\pi$. In a further aspect, the step of determining bit polarity includes selecting one of a plurality of quality values, each quality value being associated with a respective one of the phase references. The step of selecting may include comparing each of the quality values and selecting a largest value. The quality values associated with the phase references can be generated by averaging the phase samples obtained near boundaries between the symbols.

In another aspect of the invention, a method is provided for demodulating a signal frequency modulated by Manchester-coded information bits that includes the step of sampling the modulated signal's complex vector value a plurality of times during each Manchester symbol.

In other aspects of the invention, demodulators are provided that are based on the phase and complex vector values of a frequency modulated signal.

BRIEF DESCRIPTION OF THE DRAWINGS

The invention is described below in more detail with reference to the accompanying drawings, in which:

FIG. 3 represents an exemplary receiver for Manchester-coded digital demodulation using average phase values;

FIGS. 4(a)–4(d) are block diagrams illustrating exemplary phase averagers;

FIG. 6 is a block diagram of a receiver for Manchester-coded digital demodulation using complex vector values.

DETAILED DESCRIPTION

Figure 1:
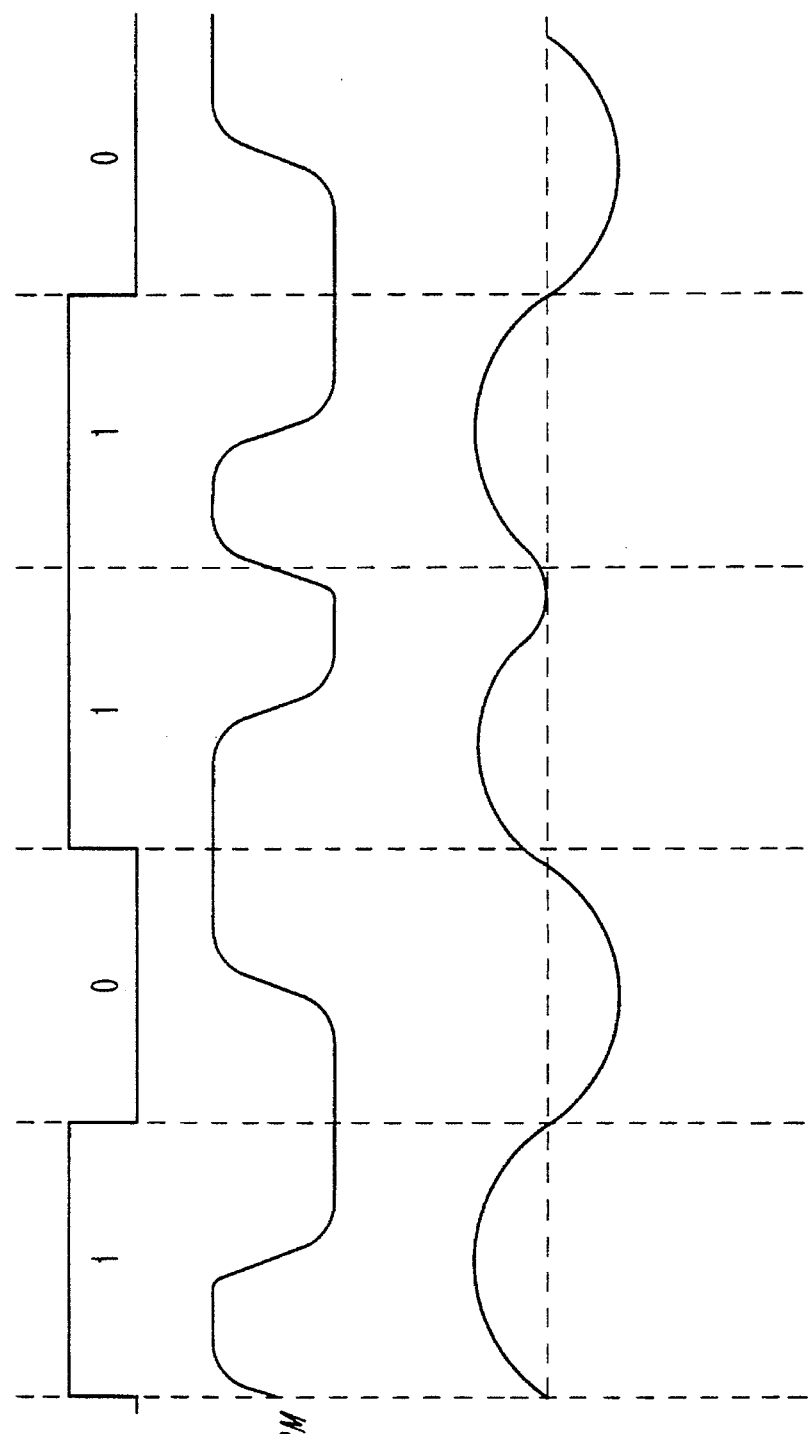
FIG. 1(a)–(c) show waveforms associated with a Manchester-coded frequency modulated radio system.

FIGS. 1(a)–1(c) show waveforms typically encountered in a Manchester-coded frequency modulated radio system. The waveform shown in FIG. 1(a) represents an information bit stream before Manchester-coding, and the waveform shown in FIG. 1(b) shows the encoded waveform (a). The signal transitions of the waveform in FIG. 1(b) are rounded to help limit the transmitted spectrum. The waveform in FIG. 1(b) is applied to a frequency modulator in the transmitter, and the phase of the modulated radio frequency carrier follows the same waveform, as seen in FIG. 1(c). It will be appreciated that the instantaneous phase is the time integral of frequency; thus, the phase of the FIG. 1(c) waveform increases rapidly during the high-frequency portions of the FIG. 1(b) waveform. Also, the phase decreases during the negative-value portions of the FIG. 1(b) waveform, and the phase increases during the positive-value portions of the FIG. 1(b) waveform.

Figure 2:
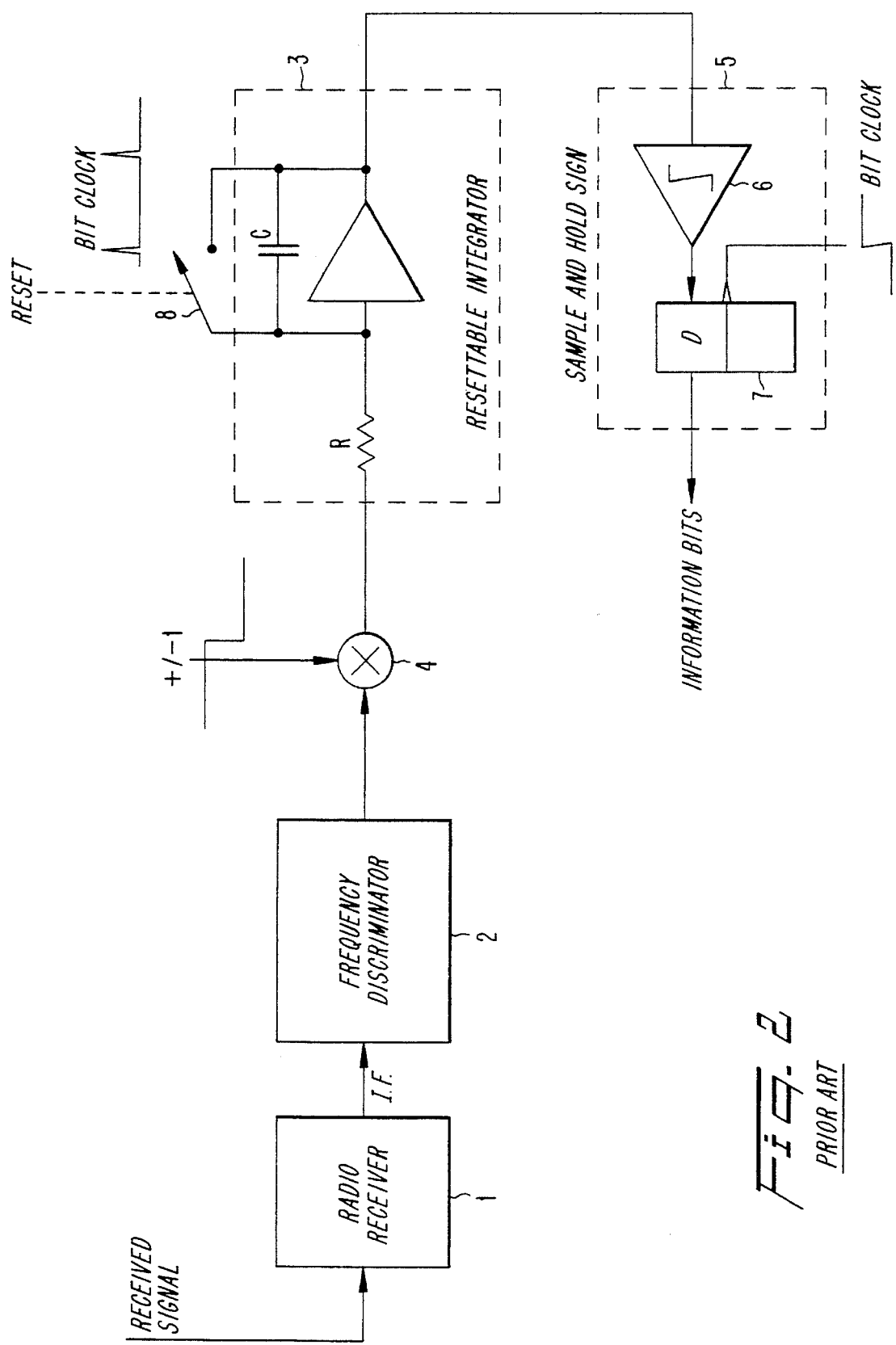
FIG. 2 shows a conventional receiver for Manchester-coded digital frequency demodulation.

Conventionally, Manchester-coded digital FM signals are demodulated using a system such as that shown in FIG. 2. A radio receiver 1 amplifies and filters a received signal and converts it to a suitable intermediate frequency (IF) for application to a frequency discriminator 2. The frequency discriminator 2 produces a voltage proportional to the instantaneous excursion of the received signal's frequency from its nominal carrier frequency, and thus reproduces the Manchester-coded modulation waveform in FIG. 1(b). The information bit polarities can be deduced either from the first half of each Manchester codeword or from the second half of the codeword, the latter being just the inverse of the first half.

By combining the information in both halves of each codeword, a bit polarity decision may be made with a reduced probability of error due to noise in transmission. The two halves of the Manchester symbol are combined by inverting the second half of the symbol and adding the result to the first half, e.g., by sampling the waveform at a minimum of two points, which ideally correspond to the middles of the first and second halves, and adding the inverse of the second-half sample to the sample from the first half.

Alternatively, an integrate-and-dump technique depicted in FIG. 2 can be used. The signal produced by the frequency discriminator 2 may be integrated by a resettable integrator circuit 3 over each whole symbol period. A sign reversal for the second half of each symbol is effected by a multiplier 4 that ensures that each second-half-symbol's contribution reinforces the contribution from each first-half-symbol. The sign of the integral, i.e., the polarity of the information bit represented by the symbol, is determined by an arrangement such as a sample-and-hold circuit 5 that includes a comparator 6 and a D-type flip-flop 7. The integrator capacitor is then promptly discharged by closing a switch 8 in preparation for integration of the next symbol. The flip-flop 7 and switch 8 are clocked by suitable readily derived bit-clock and reset signals.

Since Manchester-coded signals spend an equal amount of time high and low, the phase of the modulated signal returns to the starting value after each information bit period, or symbol period. Whether the phase excursion in the middle of a symbol was positive or negative depends on whether the frequency first went low then high, or first high then low, i.e., whether the underlying information bit is a "0" or a "1". Thus, it will be seen that the information bit polarities can be determined by measurement of the phase excursions in the middles of the Manchester symbols.

Since the absolute phase of a signal received through a radio channel is arbitrary, a phase reference must be established as a basis for comparison of the mid-symbol phase. According to one embodiment of the invention, the phase is measured at the start-points and end-points of the Manchester symbols, viz., at the boundaries between symbols where the phase is supposed to return to its initial value. The average phase established over a number of start-points and end-points is preferably used as the reference for measuring the mid-symbol phase excursions.

It is also necessary to establish symbol timing to identify the mid-points and end-points of the symbols. According to one embodiment of the invention, the phase of the radio signal is measured a plurality of times, e.g., eight, during each symbol period, with each measurement time being treated as a potential symbol end-point or mid-point. A sequence of received symbols is demodulated with, in this example, each of the eight possible timing phases to determine an estimated best result.

The "best" result can mean that the timing phase which produces a demodulated bit sequence that most closely matches a predetermined transmitted bit sequence is used. The signalling messages in the AMPS cellular telephone system used in the United States include such predetermined sequences as message preambles. The known preamble sequence, or pattern, comprises a number of alternating "1" and "0" Manchester symbols, called a dotting sequence, and a SYNCWORD. A preferable SYNCWORD has the Barker property that it is unlikely to be confused with shifts of itself for reasons that are explained in more detail below.

Normally, the dotting sequence is used to achieve symbol synchronization prior to using that symbol timing to search for the SYNCWORD. In contrast in Applicant's preferred embodiment, all symbol timing phases are processed and the dotting sequence can instead be treated as an extension of the SYNCWORD. Thus, Applicant's demodulator searches for patterns of five bits of a dotting sequence, ten bits of a SYNCWORD, and one unknown bit called a busy/idle bit (which is not material here) as described in more detail below.

The operation of a Manchester-code FM demodulator according to the invention will now be described assuming eight timing phases. Referring to FIG. 3, a radio receiver 11 suitably downconverts, filters, and amplifies a Manchester-coded FM signal, converting it to a suitable IF signal that is applied to a phase detector or phase measuring device 15. The phase detector 15 preferably produces a digital measurement of the signal's instantaneous phase. Preferred phase detectors are described in U.S. Pat. No. 5,084,669, and in allowed U.S. patent application No. 07/736,430, both of which are expressly incorporated here by reference.

The modulus of the numerical representation produced by the phase detector preferably corresponds to the circular $2\pi$ domain of phase. For example, if the phase detector produces an 8-bit binary representation, the decimal number range 0 to 256 maps to the phase angle range 0 to 360 degrees. Phase measurements are produced at a regular sampling rate of eight times the symbol rate, giving eight phase samples per Manchester symbol in this example.

An 8-way demultiplexer 16 divides the eight phase samples per symbol into eight streams of one phase sample per symbol. If stream 0 comprises the phase samples taken at the symbol boundaries, then stream 4 comprises the mid-symbol phase samples. Likewise, if stream 1 comprises the phase samples at the symbol boundaries, then stream 5 comprises the mid-symbol phase samples, and so-on. Thus in this example, whichever stream contains the symbol-boundary phase samples will be four streams away, modulo 8, from the stream containing the mid-symbol phase samples.

A preferred embodiment of the demultiplexer 16 comprises an electronic memory (such as a random access memory or RAM). Sequential phase values from the phase detector 15 are written into one of eight memory positions in the memory indicated by an address counter that increments modulo-8 after each write operation. Thus, values more than eight ago are overwritten by the latest phase values.

The eight phase-sample streams from the demultiplexer 16 are applied to eight phase averagers 17 that each compute an average phase value assuming that the respective phase-sample stream comprises symbol-boundary phase samples. The average phase values are associated with respective memory positions in the demultiplexer 16. When an old phase sample is overwritten by a new phase sample, the associated average phase value is updated. The phase averagers 17 can employ two general ways of updating the average phase values.

Each phase averager 17 can include a digital phase-locked loop as shown in FIG. 4(a) for updating the average phase value. In this case, frequency error estimates are also associated with each of the eight average phase value memories. The frequency error estimates are estimates of the average, systematic phase change, or drift, between old and new phase samples of the respective timing positions.

Each phase-locked loop or Kalman filter maintains an estimate of the phase drift rate and uses the estimate to carry forward the previous average phase value to predict the next phase sample value. The error between the predicted phase sample value and the actual phase sample value is used to correct the prediction and also to correct the estimate of the phase drift rate. For example, the corrected average phase moves from the predicted phase towards the observed phase, while the estimate of drift rate increases if the observed phase drifts beyond the predicted value in the predicted direction.

Denoting a previous phase sample value by $\Theta_{i-1}$, a new phase sample value by $\Theta_{i-1}$, a previous frequency error estimate by $\phi_{i-1}$, a new frequency error estimate by $\phi_i$, and a prediction of the new phase sample value by $\phi_i$, the averager 17 including the Kalman filter shown in FIG. 4(a) updates the phase sample value $\Theta$ and the frequency error estimate $\phi$ by the following steps:

predicting a value $\phi_i$ for the expected value $\Theta_i$ from $\phi_i = \phi_{i-1} + \phi_{i-1}$;

determining the prediction error from $\epsilon = \Theta_i - \phi_i$;

correcting the prediction $\phi_i$ from $\phi_i = |\phi_i + \alpha\epsilon|_{2\pi}$; and computing the next value $\phi$ from $\phi_i = \phi_{i-1} + \beta\epsilon$.

This procedure is repeated for each clock tick, and it will be understood that FIG. 4(a) shows the situation at the i-th clock tick before the calculations are performed. After calculation and the clock has ticked on to i+1, the situation is as shown in FIG. 4(b). The corrected value of $\phi_i$ is in the position formerly occupied by $\phi_{i-1}$ and $\phi_i$ a replaces $\phi_{i-1}$. (Hence the foregoing expression $\phi_i = |\phi_i + \alpha\epsilon|_{2\pi}$ and not $\phi_{i-1} = \ldots$ since it is the next value that is being calculated.)

It will be appreciated by those of ordinary skill in the art that the bandwidth and transient response of the loop are determined by $\alpha$ and $\beta$, and suitable values are readily determined according to the principles of digital phase-locked loop design set forth in the literature, including J. Hein et al , . "z-Domain Model for Discrete-Time PLL's" *IEEE Trans Circuits & Sys.*, vol. 35, pp. 1393–1400 (Nov. 1988) and F. Gardner, *Phaselock Techniques*, 2d. ed., John Wiley & Sons, New York (1979). Selecting $\alpha$ and $\beta$ values that are inverse powers of two advantageously simplifies hardware implementation because multiplication reduces to merely a bit shift in binary phase values.

Instead of using phase-locked loops, the phase averagers 17 can update the average phase values via circular averaging to avoid the problem of +180° and −180° averaging to the wrong value of zero. In circular averaging as shown in FIG. 4(c), each averager 17 determines separate averages of the sine and cosine of a respective phase-sample stream from the demultiplexer 16. The phase samples are used to address a look-up table of sines and cosines, and the average phase value is computed by taking the arctangent of the accumulated sines and cosines.

Alternatively, an average with exponential forgetting can be used, and such an average is determined by a phase averager shown in FIG. 4(d). The sines and cosines of a respective phase-sample stream from the look-up table are combined with accumulated previous values as follows:

$$SIN_{AV} = SIN_{AV} + \alpha(SIN\ \Theta_{new} - SIN_{AV})$$

and $$COS_{AV} = COS_{AV} + \alpha(COS\ \Theta_{new} - COS_{AV})$$

where $\alpha$ is an exponential forgetting factor. As in the averager shown in FIG. 4(c), the average phase value is computed by taking the arctangent of $SIN_{AV}$ and $COS_{AV}$.

Figure 5C:
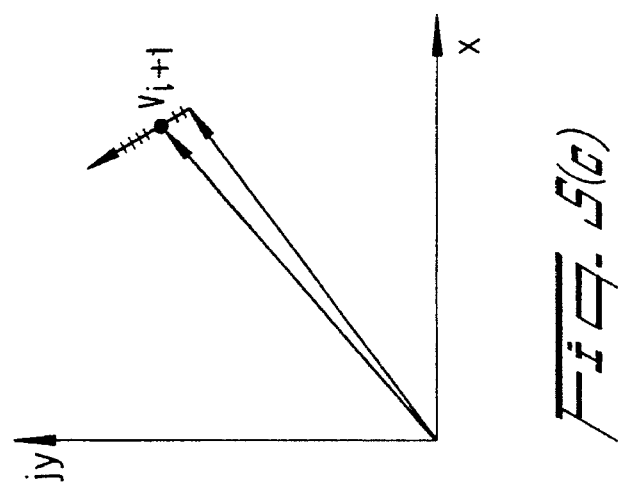
FIGS. 5(a), 5(b), and 5(c) show details of an exemplary reference vector averaging procedure according to the present invention.
Figure 5B:
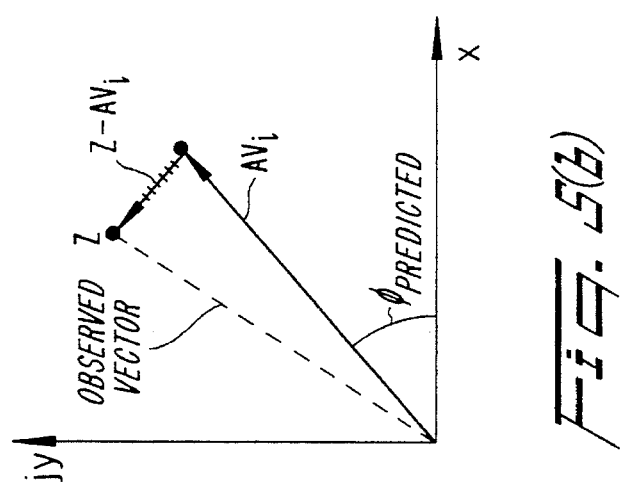
Figure 5A:
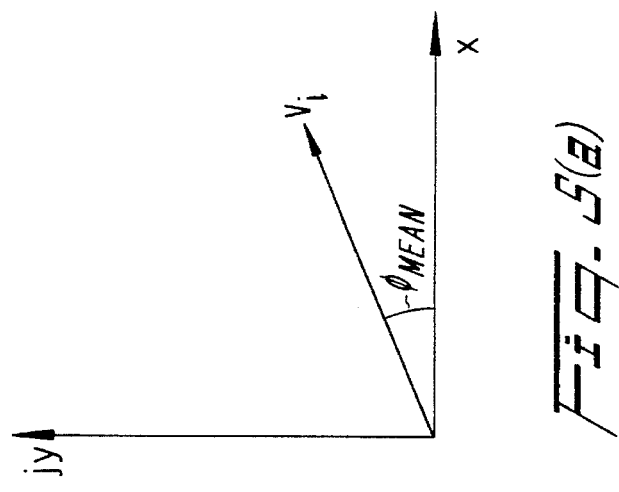

FIGS. 5(a) and 5(b) illustrate the operation of the frequency error correction mechanism. FIG. 5(a) shows a complex vector $V_i$ representation of a current estimate of mean phase $\phi_{mean}$. The real and imaginary parts x, jy, of the phase vector $V_i$ are, respectively, the cosine and sine of the mean phase. Using a corresponding current frequency error estimate, or phase drift rate, the phase vector $V_i$ is predicted forward one symbol period by rotating it through an angle $\phi_{predicted}$ that is equal to the expected drift in a sample period, thereby obtaining a vector $AV_i$ shown in FIG. 5(b). The actual phase vector Z observed through the receiver is added to the phase vector $V_i$ with suitable scaling relative to the predicted mean phase vector $AV_i$ to give a desired rate of correction. For example, 1/16th of the observed phase vector Z can be added to 15/16th of the predicted mean phase vector $AV_i$. It will be appreciated that such power-of-two scaling facilitates hardware implementation with digital logic.

Expressed in equation form, a formula for updating the phase vector is the following:

$$V_{i+1} = A_i V_i + B(Z - A_i V_i)$$

where $V_{i+1}$ is the updated phase vector, $V_i$ is the previous phase vector, Z is the observed (received) phase vector, B is a real factor determining the rate of update, for example $2^{-n}$ and $A_i$ is a complex rotation factor corresponding to the expected phase drift per symbol.

The rotation factor may be updated using the formula:

$$A_{i+1} = A_i + C(Z/V_i - A_i)$$

where C is a factor similar to B that determines the rate of update.

The quantities $\alpha$, $\beta$, $\epsilon$, $\phi$, $\phi$, and $\Theta$ do not equal the corresponding quantities B, C, Z, $A_i$, $V_i$, etc. because the former are angular (phase) quantities while the latter are Cartesian vector (x,y) quantities. On the other hand, determining the error between the prediction and the received value (previously, $\epsilon = \Theta_i - \phi_i$) is replaced by determining a vector error $(Z_i - A_i V_i)$. The complex value A corresponds to the frequency estimate $\phi$ in the phase-locked loop version, B corresponds to $\alpha$, C corresponds to $\beta$, V is the prediction of the next complex vector Z to be received, corresponding to $\phi$ in the phase-locked loop version, and Z is the sequence of received complex vectors to be tracked, corresponding to the input phase sequence $\Theta$ in the phase-locked loop version.

The previous updating of the phase estimate by $\phi_i = \phi_i + \alpha \epsilon|_{2\pi}$ is replaced by the vector updating $V_{i+1} = A_i V_i 30 B(Z_i - A_i V_i)$. Either expression reads: NEW AVERAGE=LAST PREDICTION+FRACTION OF (PREDICTION ERROR). Previous frequency updating $\phi_i = \phi_{i-1} + \beta \epsilon$ is replaced by updating the complex rotation factor $A_{i+1} = A_i + C(Z_i/V_i - A_i)$. Either expression reads: NEW ESTIMATE OF SYSTEMATIC ROTATION PER SYMBOL PERIOD=OLD ESTIMATE+FRACTION OF (ERROR IN ROTATION FACTOR). The quantity C determines the amount of smoothing of the estimate of the systematic rotation. The quantity $Z_i/V_i - A_i$ is used for rotation factor error so that it modifies the magnitude of $A_i$ as well as its angle. Thus, the prediction gives a growing or diminishing vector to track an increasing or fading signal strength.

The phase averagers 17 generate eight candidate phase references for measuring the mid-symbol phase excursions as described above, and they also preferably generate eight associated quality values. The sum of the squares of the average sine and average cosine of the phase-value streams may be used as measures of the quality of the phase references. A large amount of jitter on the phase samples generated by the detector 15 tends to depress such a quality measure. Other methods of constructing a quality measure can be used, some of which are described below and all of which are considered to be within the scope of the present invention. As described in more detail below, the quality measures generated by the phase averagers 17 are used to determine a "best" phase reference.

Each phase reference is used in conjunction with the phase sample stream four away from the sample stream used to compute the reference in order to determine the polarity of the phase excursion and obtain an estimate of a demodulated information bit. Eight streams of demodulated information bits are produced corresponding to each of the candidate phase references. A phase reference and a phase sample are compared in one of eight modulo-$2\pi$ phase differencers 18 which yields a "1" if the phase difference is between 0° and +180° and a "0" if the phase difference is between 0° and −180°.

Errors are likely if phase differences in the region of 180° are encountered. The least likelihood of error occurs when the expected phase differences are diametrically opposite for "1" s and "0"s respectively, that is +90° or −90°. This determines the optimum relation between the information bit rate and the peak frequency modulation excursion for best system performance. For example, the optimal peak FM excursion is 5 KHz for an information bit rate of 10 Kbits per second. For filtered Manchester coded signals, the peak deviation should be increased by about $\pi/2$ to give $\mp 90°$ change over a symbol.

Which of the eight candidate timing phases (and which of the eight demodulated data bit streams) to select is determined as follows. One exemplary method is to compare the reference quality values from the eight phase averagers 17 in a discriminator 19, which may simply be an 8-input comparator. The discriminator 19 determines which quality measure is largest, and generates a signal that controls an 8-way switch 20, thereby selecting the corresponding information bit stream. This selection process can in principle operate continuously so that the selection switch changes dynamically, always selecting a bit from the stream determined to be the "best".

An alternative method involves applying the eight estimated information bit streams to eight pattern detectors or correlators 21, each of which provides a signal if a predetermined pattern, inserted by the transmitter, is recognized. One of the pattern detectors 21 will register detection first, and the pattern detectors associated with the other sampling phases will subsequently register detection. The sampling phase corresponding to the pattern detector registering detection midway between the first and last detectors to register detection is preferably selected. This phase is taken as the "best" for a predetermined number of information bits until the predetermined pattern is again expected. The predetermined number of information bits depends on the accuracy of the phase sampling clock relative to the transmitted bit rate. The accuracy should correspond to a timing drift between resyncs, i.e., re-transmissions of the predetermined pattern, which is less than 1/8th of a symbol.

Each pattern detector 21 comprises a register for storing the expected predetermined pattern and a demodulated-bit register for storing the last sixteen demodulated bits for a respective one of the eight timing phases. If a demodulated-bit register contains the expected pattern (with the busy/idle bit a don't-care), then that timing phase is deemed by the discriminator 19 to be the "best" one.

The demodulated-bit registers corresponding to a few adjacent timing phases may contain the expected pattern, in which case the discriminator 19 would determine the center of that cluster of timing phases. The center timing phase can be used as the "best" timing phase for demodulating the rest of the message. If the SYNCWORD has the above-described Barker property, the predetermined pattern is likely to be recognized only when correctly aligned in the demodulated-bit register.

In another embodiment, each pattern detector 21 determines the number of mismatching bits between the expected pattern and the respective demodulated bit pattern. Over a moving window of three or five consecutive timing phases, these error counts are accumulated by the discriminator 19, which determines the window position containing the minimum error count. The discriminator then deems the "best" timing phase to be the central phase within the three- or five-phase window. Alternatively, the "best" timing phase may be the phase which produces a phase reference having the least jitter, as described above.

In another aspect of the invention, complex vector values rather than phase values can be used for demodulation without computing average phase values. A block diagram of such a system is shown in FIG. 6. A complex vector generator 150 converts the IF output of the receiver 11 into complex vector values Z. The complex vector generator 150 is a counterpart of the phase detector 15 shown in FIG. 3. They respectively convert the received signal into the form desired for processing, e.g., digital phase measurements for the phase formulation, or a series of complex numbers in one of polar, logpolar, or Cartesian form for the complex vector formulation. Complex vector values are produced at a regular sampling rate, for example eight times the symbol rate giving eight vectors per Manchester symbol.

Each complex vector Z has a real part that is the product of the signal amplitude and the cosine of the signal phase and an imaginary part that is the product of the signal amplitude and the sine of the signal phase. The vector values Z can be generated in polar or logpolar notation, which can be numerically transformed by known transformations to Cartesian values if desired. The vector generator 150 preferably measures signal amplitude at the same time as it measures signal phase, as described in U.S. Pat. No. 5,048,059 which is expressly incorporated here by reference.

An 8-way demultiplexer 160 divides the eight vectors per symbol into eight streams of one complex vector per symbol. In a manner similar to the demultiplexer 16, the demultiplexer 160 advantageously comprises an electronic memory into which sequential complex vectors from the vector generator 150 are written under the control of a suitable address counter.

Letting a sequence of complex vectors $Z_0, Z_8, Z_{16}, \ldots$ correspond to timing phase 0, the average $Z_{AV}$ of the sequence is determined by a vector averager 170, which is a counterpart of the phase averagers 17, by complex addition as follows:

$$Z_{AV} = Z_0 + Z_8 + Z_{16} + \ldots$$

Scaling by dividing Z AV by the number of vectors added is a matter of choice.

Just as the phase averagers described above, the averagers 170 generate reference vectors that are averages of the vector sequences in several ways. If a square averaging window is used, the oldest vector value is subtracted from the average when the newest value is added. Letting $Z_{AV} = Z_0 + Z_8 + Z_{16}$ at this instant, the next value is given by the following expression:

$$Z_{AV} = Z_8 + Z_{16} + Z_{24} = Z_{AV} + Z_{24} - Z_0.$$

Alternatively, an average with exponential forgetting can be used, and such an average is determined as follows:

$$Z_{AV} = Z_{AV} + \alpha(Z_{new} - Z_{AV})$$

where $\alpha$ is the exponential forgetting factor and $Z_{new}$ is the latest complex vector. An average produced by a Kalman filter, or phase-locked loop, such as the arrangement illustrated in FIG. 4(*a*) can also alternatively be used.

The complex vector averaging process described above can also be used when a hard-limiting receiver is employed, i.e., when the receiver does not produce continuous values of signal amplitude, just unitary values. This corresponds to averaging the cosines and the sines of the phase angle, except that the arctangent of the result need not be computed unless the average phase is needed.

Demodulation takes place in the system shown in FIG. 6 by manipulating Cartesian or Z values without computing the average phase and thus without using an arctangent function. In this example, eight multipliers 180 form products given by the following expression:
ti $Z \cdot Z^*_{REF}$
where Z is a complex vector corresponding to a postulated information-bit-center timing from the demultiplexer 160, $Z_{REF}$ is an average reference vector generated by an averager 170 computed as described above, and * indicates complex conjugation. The imaginary part of the foregoing expression has a sign corresponding to the polarity of the underlying information bit. In the foregoing expression, each complex vector Z is from a vector stream that is four away from the vector stream used to obtain the reference vector $Z^*_{REF}$. This is just the relationship between the phase samples and the average phase values illustrated in FIG. 3.

The imaginary part can also be used as a "soft" bit value for input to an error correction process. To obtain "soft" values in the phase processing implementation shown in FIG. 3, the sine of the phase difference between a mid-bit phase value and its corresponding phase reference can be used. This corresponds to the imaginary part of the expression $Z \cdot Z^*_{REF}$ when a hardlimiting receiver is used, in which case the amplitudes of the Z values are unity.

The other components and their functions of the embodiment shown in FIG. 6 are similar to the corresponding components and their functions of the embodiment shown in FIG. 3. A discriminator 190 determines the "best" reference vector from quality measures produced by the averagers 170 and information-bit-pattern recognition signals produced by pattern detectors 210. A suitable selection switch 200, which may be simply an address to a location in an electronic memory, selects the proper information bit stream. Synchronization performance can also be improved, in the event that no bit pattern recognition signal reaches a desired minimum threshold within an expected time window, by selecting the same vector stream and message start point for producing the demodulated output as last time, using knowledge of the length of the previous message. (This may be called "flywheel sync".)

It will be appreciated that the foregoing functions and calculations can conveniently be performed by any digital signal processor (DSP) having sufficient processing speed to execute the formulae for all phase sample or complex vector streams within the time of one symbol period.

In systems where data transmission is not continuous, but consists for example of speech punctuated with bursts of data, the phase reference will not be correctly established at the commencement of a data burst, but will require a number of Manchester symbols to pass through the system before the possibly unrelated, and thus erroneous, phase value calculated from the latest speech segment has been flushed. Loss of the initial data symbols can be avoided by holding the samples in a memory, and retrospectively decoding them by projecting the reference backwards in time using the frequency error estimate to determine the phase drift rate per symbol period. If dP is the phase change per symbol period and $P_i$ is a current phase reference estimate, then a retrospective phase reference for k symbols ago can be calculated from the following:

$$P_{i-k} = P_i - k.dP, \text{ modulo } 2\pi$$

When phase drift over a symbol period is large, it is often necessary to correct for the difference between the phase at the symbol boundaries, from which the reference is determined, and the phase at the symbol mid-point to accurately demodulate the information bit. The foregoing equation can be applied by projecting the phase reference forward or backward half a symbol period, as shown by the following expression:

$$P_{i\pm0.5} = P_i - 0.5dP$$

to calculate the phase reference.

While particular embodiments of the invention have been described and illustrated, it should be understood that the invention is not limited thereto since modifications may be made by persons skilled in the art. The present application contemplates any and all modifications that fall within the spirit and scope of the invention, as defined by the following claims.

What is claimed is:

1. A method for demodulating coded information bits, wherein the information bits have been converted to Manchester-coded symbols that modulate a carrier signal's frequency and the modulated carrier signal has a phase that depends on the symbols comprising the steps of:

sampling the modulated carrier signal's phase a plurality of times during each symbol; and determining the information bits represented by the symbols from phase samples obtained near the centers of the symbols.

2. The method of claim 1, wherein the determining step includes the step of selecting the phase samples nearest the centers of the symbols.

3. The method of claim 2, wherein the determining step includes the step of determining the signs of differences between the phase samples and a plurality of phase references derived from the modulated carrier signal, computed modulo $2\pi$.

4. The method of claim 1, wherein the determining step includes the step of comparing each of the phase samples with each of a plurality of phase references derived from the modulated carrier signal.

5. The method of claim 1, further comprising the step of deriving a plurality of phase references from phase samples near boundaries between the symbols.

6. The method of claim 5, wherein the deriving step includes the step of averaging the phase samples.

7. The method of claim 6, wherein the averaging step includes the step of separately averaging cosines and sines of the phase samples.

8. The method of claim 5, wherein the deriving step is based on a moving average of phase samples near the boundaries of the symbols.

9. The method of claim 5, wherein the deriving step includes the step of applying the phase samples to a phase tracking loop.

10. The method of claim 5, wherein the deriving step includes the step of applying the phase samples to a Kalman filter.

11. The method of claim 1, wherein the determining step includes the step of determining the signs of phase differences between the phase samples and a plurality of corresponding phase references derived from the modulated carrier signal, computed modulo $2\pi$.

12. The method of claim 11, wherein said determining step comprises the step of determining soft symbol values which are sines of said phase differences.

13. The method of claim 12, wherein soft symbol values are employed to decode redundantly coded information bits.

14. The method of claim 1, wherein the determining step includes the step of selecting one of a plurality of quality values, each quality value associated with a respective one of a plurality of phase references derived from the modulated carrier signal.

15. The method of claim 14, wherein the selecting step includes the steps of mutually comparing each of the quality values and selecting a largest value.

16. The method of claim 14, further comprising the step of determining each of the quality values associated with each of the phase references by averaging the phase samples near boundaries between the symbols to generate quality values associated with each of the phase references.

17. A method for demodulating coded information bits, wherein the information bits have been converted to Manchester-coded symbols that modulate a carrier signal's frequency and the modulated carrier signal has a complex vector value that depends on the symbols, comprising the steps of:

sampling the modulated carrier signal's complex vector value a plurality of times during each symbol; and determining the information bits represented by the symbols from complex vector value samples obtained near the centers of the symbols.

18. The method of claim 17, wherein the determining step includes the step of selecting the complex vector value samples nearest the centers of the symbols.

19. The method of claim 17, wherein the determining step includes the step of multiplying each of the complex vector value samples by each of a plurality of complex vector references derived from the modulated carrier signal.

20. The method of claim 19, wherein the determining step includes the step of determining the signs of the imaginary parts of the products of said multiplications.

21. The method of claim 19, wherein said determining step comprises the step of producing soft symbol values equal to the imaginary parts of the products of said multiplications.

22. The method of claim 21, wherein the soft symbol values are employed to decode redundantly coded information bits.

23. The method of claim 17, further comprising the step of deriving a plurality of complex vector references from complex vector value samples near boundaries between the symbols.

24. The method of claim 23, wherein the deriving step includes the step of vector averaging the complex vector value samples.

25. The method of claim 24, wherein the averaging step includes the step of de-emphasizing older complex vector value samples exponentially according to sample age.

26. The method of claim 23, wherein the deriving step is based on a moving average of complex vector value samples near the boundaries of the symbols.

27. The method of claim 23, wherein the deriving step includes the step of applying the complex vector value samples to a Kalman filter.

28. The method of claim 17, wherein the determining step includes the step of selecting one of a plurality of quality values, each quality value associated with a respective one of a plurality of complex vector references derived from the modulated carrier signal.

29. The method of claim 28, wherein the selecting step includes the steps of comparing each of the quality values and selecting a largest value.

30. The method of claim 28, further comprising the step of determining each of the quality values associated with each of the complex vector references by averaging the complex vector value samples near boundaries between the symbols and determining a magnitude of the resulting average.

31. A demodulator for recovering information bits that have been converted to Manchester-coded symbols that modulate a signal's frequency comprising:

means for generating a first phase signal from the signal, the first phase signal comprising successive phase values, a plurality of phase values being generated during each symbol;

means for dividing the first phase signal into a plurality of second phase signals, each second phase signal comprising respective ones of the phase values generated during successive symbols;

means for averaging each of the second phase signals and for generating a plurality of candidate phase reference signals;

means for comparing each of the candidate phase reference signals and selected ones of the second phase signals and for generating a plurality of estimated demodulated signals; and means for selecting one of the estimated demodulated signals and providing the selected one to an output of the demodulator as a demodulated information bit signal.

32. The demodulator of claim 31, wherein the dividing means comprises an electronic memory.

33. The demodulator of claim 31, wherein the averaging means comprises a Kalman filter.

34. The demodulator of claim 31, wherein the averaging means comprises means for circular averaging each of the second phase signals.

35. The demodulator of claim 31, wherein the averaging means comprises means for averaging with exponential forgetting each of the second phase signals.

36. The demodulator of claim 31, wherein the averaging means generates a plurality of quality values corresponding to respective ones of the candidate phase reference signals and the selecting means comprises means for determining the largest quality value and for generating a control signal and means, responsive to the control signal, for providing the estimated demodulated signal corresponding to the largest quality value to the output.

37. The demodulator of claim 31, wherein the selecting means comprises means for detecting a predetermined bit pattern in each of the estimated demodulated signals.

38. The demodulator of claim 37, wherein the predetermined bit pattern detecting means comprises means for determining a respective number of mismatching bits between the predetermined bit pattern and each respective estimated demodulated signal and the selecting means selects one of the estimated demodulated signals based on the numbers of mismatching bits.

39. A demodulator for recovering information bits that have been converted to Manchester-coded symbols that modulate a signal's frequency comprising:

means for generating a first signal from the signal, the first signal comprising successive complex vector values, a plurality of complex vector values being generated during each symbol;

means for dividing the first signal into a plurality of second signals, each second signal comprising respective ones of the complex vector values generated during successive symbols;

means for averaging each of the second signals and for generating a plurality of candidate reference signals;

means for generating products of complex conjugates of each of the candidate reference signals and selected ones of the second signals and for generating a plurality of estimated demodulated signals; and means for selecting one of the estimated demodulated signals and providing the selected one to an output of the demodulator as a demodulated information bit signal.

40. The demodulator of claim 39, wherein the dividing means comprises an electronic memory.

41. The demodulator of claim 39, wherein the averaging means comprises a Kalman filter.

42. The demodulator of claim 39, wherein the averaging means comprises means for averaging with exponential forgetting each of the second signals.

43. The demodulator of claim 39, wherein the averaging means generates a plurality of quality values corresponding to respective ones of the candidate reference signals and the selecting means comprises means for determining the largest quality value and for generating a control signal and means, responsive to the control signal, for connecting the estimated demodulated signal corresponding to the largest quality value to the output.

44. The demodulator of claim 39, wherein the selecting means comprises means for detecting a predetermined bit pattern in each of the estimated demodulated signals.

45. The demodulator of claim 44, wherein the predetermined bit pattern detecting means comprises means for determining a respective number of mismatching bits between the predetermined bit pattern and each respective estimated demodulated signal and the selecting means selects one of the estimated demodulated signals based on the numbers of mismatching bits.

* * * * *